United States Patent [19]

Vandenberg

[11] 4,261,597

[45] Apr. 14, 1981

[54] AXLE ALIGNMENT MECHANISM AND METHOD

[75] Inventor: Ervin K. Vandenberg, Massillon, Ohio

[73] Assignee: Turner Quick-Lift Corporation, Canton, Ohio

[21] Appl. No.: 29,177

[22] Filed: Apr. 12, 1979

[51] Int. Cl.³ .............................................. B60G 11/00
[52] U.S. Cl. .................................... 280/688; 280/711
[58] Field of Search .............. 280/712, 713, 711, 693, 280/702, 688; 267/52

[56] References Cited

U.S. PATENT DOCUMENTS

| | | | |
|---|---|---|---|
| 3,482,854 | 12/1969 | Masser | 280/713 |
| 3,630,541 | 12/1971 | Carlson | 280/713 |
| 3,960,388 | 6/1976 | Strader | 280/693 |
| 4,162,090 | 7/1979 | Schwartz | 280/688 |

Primary Examiner—Robert R. Song
Attorney, Agent, or Firm—Geoffrey R. Myers

[57] ABSTRACT

A mechanism for aligning an axle using a beam suspension connected at its ends to the vehicle and intermediate its ends to the axle, the mechanism including a saddle connector for the axle and beam which allows the axle to be rigidly connected before alignment and the beam to be slidably retained therein and a plate rigidly connected to the saddle connector and extending to a location proximal the beam. The method including the step of being able to first rigidly connect the axle to the suspension at a location capable of doing so, and thereafter aligning the suspension after installation on the vehicle by merely sliding the beam in the saddle connector and ridgly attaching the portion of the plate proximal the beam to the beam, thereby to secure the alignment.

19 Claims, 2 Drawing Figures

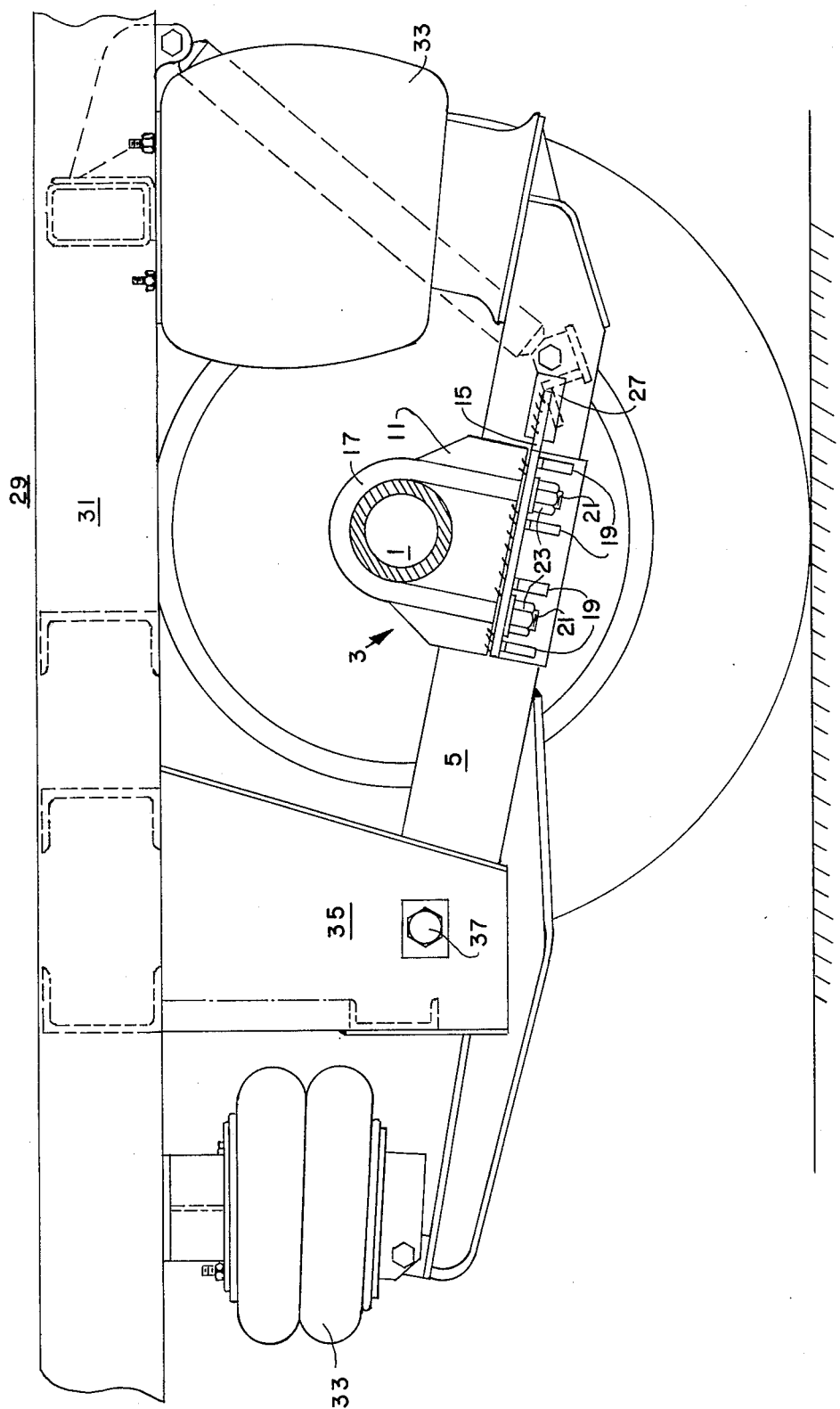

AXLE ALIGNMENT MECHANISM AND METHOD

This invention relates to improvements in wheeled vehicle suspensions of the beam type. More particularly, this invention relates to a mechanism for securing the alignment of axles on a vehicle employing beam suspensions and a method of achieving such alignment.

Trucks and trailers often employ suspension systems of the beam type. Such suspensions generally include a longitudinally extending beam on either side of the vehicle, often referred to as an "equalizing" beam. The beam is usually pivotally connected at one end to a hanger bracket which in turn is connected to a longitudinal frame member of the truck chassis or trailer. The pivot connection may include a resilient bushing. The other end of the beam may be likewise connected, or more popularly is provided with an inflatable airbag which, in turn, is connected to a frame member of the vehicle. An axle is laterally connected across the two beams thus to provide road-engaging wheels for the vehicle.

For safety, vehicle performance, and other purposes, it is necessary that the axle be carefully aligned with the vehicle, thus to present to the road surface tires which project in the precise direction of movement of the vehicle. In order to achieve the necessary alignment in the beam type suspensions with which this invention deals, there is normally established a prescribed connection between the longitudinal frame members of the vehicle and certain connecting members of the suspension located at or near the ends of the beam. Typically such connecting members are hanger brackets and airbags. Such a connection, between frame member to bracket and bag, forms the first locus of alignment in that the ends of the beam through these members are ultimately connected to the longitudinal frame member of the vehicle chassis which in turn sets the general "line" or basic alignment of the suspension with the vehicle.

The next locus of alignment is the connection point of the axle to the two beams of the suspension, one on either side of the vehicle, located adjacent a respective longitudinal frame member. Since the axle, in the typical situation extends laterally across the beams thereby to provide road engaging wheels (including tires) outboard of the suspension, adjustment of each connection of the axle to the two beams, one with respect to the other, also determines the alignment of the suspension and thus the road engaging tires with respect to the vehicle.

Still another locus of alignment is at either end of the beam as it forms its connection with the hanger bracket or airbag. By adjusting the point at which such a connection is located along one end of its beam with respect to the point of connection chosen for the same connection on the other beam, the alignment of the suspension and thus tires with respect to the vehicle may be established.

Most prior art alignment techniques employ the first described locus as the primary means of establishing general alignment. Thereafter, more precise alignment is obtained by using one or both of the other two described locus. Various techniques have been devised for use at these latter two locii. Exemplary of such techniques are those disclosed in U.S. Pat. Nos. 3,482,854 and 3,960,388.

Generally speaking, these prior art techniques, while reasonably effective for their intended purposes, have often required that the beam (e.g., "equalizing" beam) to frame hanger bracket connection (pivot) be torqued by the first installer when achieving alignment. Large bolts of from about 1⅛" to about 1¼" are often necessary to employ, and they require very high torque levels not always achievable at final assembly with the tools available. If improperly torqued the bolts can loosen, fall out and cause loss of vehicle control. In addition to this safety problem is the additional problem that many prior art techniques, to be effective, must be rather complex and thus expensive to use and/or replace.

It is apparent from the above that there exists a need in the art for an improved axle alignment mechanism and technique where suspensions of the beam type are used. It is also apparent from the above that the art is in need of an effective alignment mechanism and technique which overcomes the safety and economic problems heretofore experienced. It is a purpose of this invention to fulfill this and other needs more apparent to the skilled artisan once given the following disclosure.

Generally speaking this invention fulfills its purpose by providing improved axle alignment mechanisms and methods. The axle alignment mechanism contemplated by this invention generally include:

A mechanism for securing an axle having at least one road engaging wheel in alignment with a vehicle by means of a suspension system which includes a longitudinal beam, means for connecting the ends of the beam to the vehicle and means for connecting the axle to the beam at a location intermediate the ends of the beam, the mechanism comprising, as said means for connecting the axle to the beam a first means for rigidly connecting the axle thereto and for slidably engaging the beam, and second means rigidly connected to said first means and extending to a location proximal the beam from which location said second means may be rigidly connected to said beam.

In certain preferred embodiments one end of the beam is pivotally connected to the vehicle and the other end of the beam is resiliently connected to the vehicle by an airbag. In other preferred embodiments the first means for rigidly connecting the axle thereto includes a saddle member having a first surface compatible in shape with the outer cross-sectional shape of the axle and on which the axle resides and a second surface compatible in shape with the outer cross-sectional shape of the beam and on which the beam is slidably engaged. In still further preferred embodiments the first and second surfaces are joined by a walled member which rigidly retains the first and second surfaces so that sliding movement of the beam in or on the second surface moves the beam in a substantially perpendicular direction with respect to the axle, and wherein the second means includes a plate rigidly connected to the walled member and extending beyond a peripheral edge of the walled member to a location proximal the beam, at which location the plate is capable of being rigidly secured to the beam. A spacer bar located on the beam may be optionally added to facilitate securing the plate to the beam.

In certain other preferred embodiments the first means for rigidly connecting the axle thereto includes bolt means for retaining the axle on the first surface, the bolt means extending between the axle and the plate connected to the walled member, the bolt means including nut means which when tightened bring the axle into retaining engagement on the first surface. This latter feature enables the bolts, prior to installation of the suspension and/or final alignment, to be torqued at a location (e.g., at the suspension manufacturing stage) having the necessary equipment to tightly secure the bolts and thereafter weld the axle to the walled members thereby to prevent any deterioration of this vital connection.

The axle alignment methods contemplated by this invention generally include:

A method of securing an axle having road engaging wheels attached thereto in alignment with a vehicle by means of a suspension system which includes a longitudinal beam, means for connecting the ends of the beam to the vehicle and means for connecting the axle to the beam at a location intermediate the ends of the beam, the steps comprising:

(a) providing an axle having road engaging wheels attached thereto, (b) providing a suspension system which includes a longitudinal beam, means for connecting the ends of the beam to the vehicle and means for connecting the axle to the beam at a location intermediate the ends of the beam, (c) providing a mechanism for securing the axle in alignment with the vehicle, the mechanism comprising, as the means for connecting the axle to the beam a first means for rigidly connecting the axle thereto and for slidably engaging the beam, and a second means rigidly connected to the first means and extending to a location proximal the beam from which location the second means may be rigidly connected to the beam, (d) rigidly connecting the axle to the first means, (e) slidably engaging the beam in the first means, (f) locating the second means proximal the beam, (g) connecting the suspension system to the vehicle, (h) aligning the axle with respect to the vehicle by sliding the beam in the first means until the desired alignment position is obtained, and (i) thereafter rigidly connecting the second means to the beam.

This invention will now be described with respect to certain embodiments thereof as illustrated in the accompanying drawings wherein:

In the drawings:

FIG. 2 is a side plan, partially sectionalized view of the axle alignment mechanism of FIG. 1 as employed in an operative vehicle environment.

Figure 1:
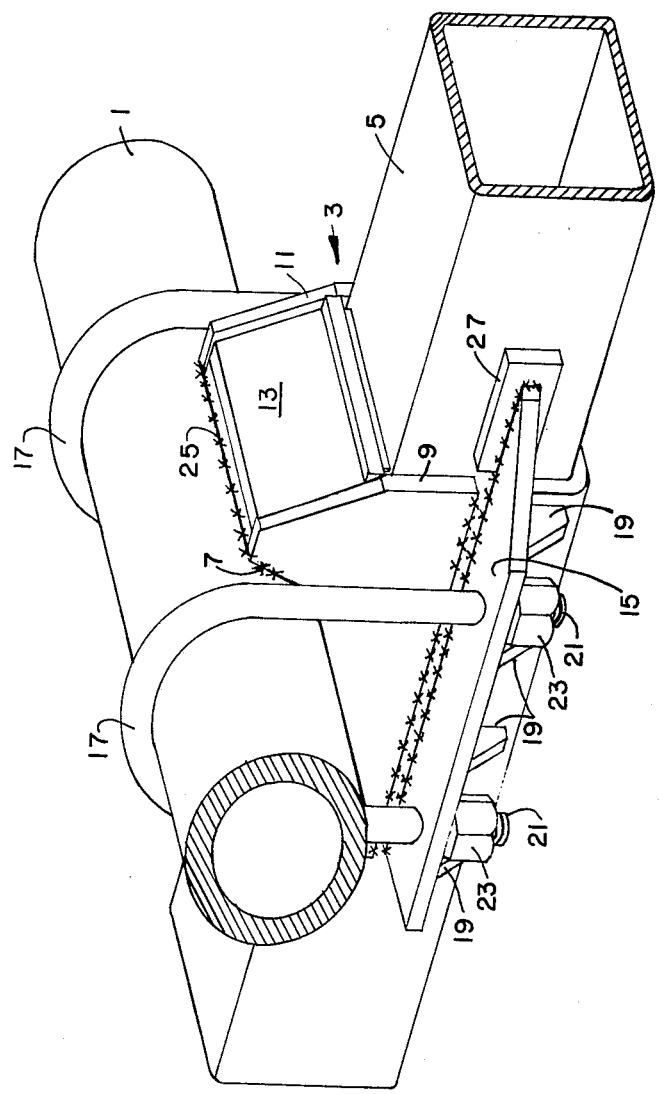
FIG. 1 is a perspective view of an axle alignment mechanism according to this invention.

With reference to FIG. 1 there is illustrated a laterally extending cylindrical axle 1 (partially shown), a saddle member 3, and a typical equalizing beam 5 of a beam type axle suspension for heavy duty trucks and trailers. Saddle member 3 includes an upper, semicylindrical first surface 7 on which axle 1 is secured, and a second box like lower surface 9 in which beam 5 slidably resides. Surfaces 7 and 9 are, in other words, compatible in shape with the outer dimension of the element which they secure. If, for example, axle 1 were rectangular and beam 5 were cylindrical, surface 7 would be semi-box like and surface 9 would be cylindrical rather than as illustrated.

Surfaces 7 and 9 are joined by common wall member 11. Surfaces 7 and 9 may be formed in part, if desired, by cap member 13 extending between wall members 11. Extending outwardly from each wall member 11 and located on both sides of beam 5 are plate flanges 15 having holes therein for receipt of U-bolts 17. Plates 15 are reinforced by members 19. U-bolts 17 help secure axle 1 to first surface 7 by wrapping over axle 1 as illustrated such that its bolt leg ends provided with screw threads 21 extend through the holes in plate 15. Nuts 23 tightly torqued at a location capable of performing this function, along with weld joint 25 along the upper length of first surface 7 on both sides of the axle, rigidly secure the axle to saddle member 3. In this respect, a particularly safe mounting at this vital connection is formed. While the size of the bolts may vary depending upon the nature of the suspension, etc., for almost all situations envisioned bolts of the size heretofore employed by the prior art as described above may be employed.

The length of wall member 11 (with respect to the longitudinal direction of the beam) is sufficient to insure stability in the mounting of beam 5. In this respect, beam 5 is only of a slightly less cross-sectional dimension than second surface 9 thereby to insure a sliding, but secure fit. In this way any substantial amount of lateral movement of beam 5 in surface 9 is eliminated.

On one or both sides of beam 5 and extending either in the forward or rearward direction, or both, plate 15 is formed so as to extend beyond the length of wall member 11. In this way plate 15 provides an extended piece of metal plate which lies proximal to the side of beam 5. Spacer 27, welded or otherwise connected to beam 5, may be placed between the gap between beam 5 and plate 15 formed by the thickness of wall member 11 thereby to allow plate 15 to be welded to spacer 27 and thus rigidly and securely connected to beam 5. Alternatively, spacer 27 could be eliminated and the extended portion of plate 15 could merely be cut in a way so as to fill the gap caused by the thickness of wall member 11 and thereby allow plate 15 to be directly connected to beam 5. It is also within the scope of this invention to provide means for securing extended plate member 15 to beam 5 other than by welding. For example, bolts could be used, welds being the preferred and most convenient form for most situations.

FIG. 1, of course, illustrates only one side of the suspension. Axle 1 continues to the other side of the vehicle where the mechanism of FIG. 1 is duplicated. By this mechanism, therefore, a safe, effective, simple, and economical technique for axle (and thus wheel) alignment is provided. For example, beam 5 may first be located, in slidable fashion, in box-like surface 9. Axle 1 is then mounted and rigidly secured in permanent fashion to saddle member 3 by tightly torquing U-bolts 17 and forming weld joints 25 using conventional welding techniques. At this point, the assembly is immovable in all modes except that beam 5 may now be slid fore and aft only, within second surface 9.

With reference to FIG. 2, the suspension may now be mounted on a vehicle 29 (e.g., truck or trailer) having longitudinal frame members 31 located on either side of the vehicle. Mounting may be accomplished in the conventional way. For example, in this embodiment, the suspension illustrated is a beam type suspension, duplicated on each side of the vehicle 29 and employing an optional liftable feature so as to be able to raise and lower the wheels in a known fashion by use of controls in the cab (not shown). Beams 5 are connected to frame members 31 at one end (usually the rearward end) by airbags 33 and at the other end by hanger bracket 35. Beam 5 is pivotally connected to the lower portion of bracket 35 by a resiliently bushed pivot connection 37.

By using such a mounting a general or primary alignment of the suspension is obtained such that axle 1 and beam 5 are substantially perpendicular, the former extending generally laterally of and the latter extending generally longitudinally with vehicle 29.

The achieve the precise alignment of the suspension necessary for safety and proper vehicle performance, one or both beams 5 may now be slid fore or aft within their respective box-like surfaces 9 until precisely the right alignment is achieved. Then by welding, using conventional techniques, the extended portion(s) of plates 15 to spacer 27 (which previously was secured to beam 5), the mounting of a safe and precisely aligned suspension has been simply, effectively, and economically accomplished.

The entire assembly can be easily removed for servicing by merely disconnecting the suspension at pivot connection 37 and airbags 33. Realignment is ordinarily not necessary if the same pivot connection and airbag bolt holes are used, unless the vehicle is damaged or incorrect alignment was done initially.

To accomplish realignment, the weld between plate(s) 15 and spacer(s) 27 is removed, beam(s) 5 readjusted by sliding it within surface 9, and the weld between plate(s) 15 and spacer(s) 27 reformed. If spacer 27 is damaged during removal of the weld, it is simply ground off and replaced. In this respect, the use of spacer 27 rather than connecting plate 15 directly to beam 5 when realignment becomes necessary, prevents damage to beam 5 which could deteriorate the beam's load carrying capacity since, in most suspensions of the beam type, it is a stressed member.

Once given the above disclosure many other features, modifications and improvements will become apparent to the skilled artisan. Such other features, modifications and improvements are, therefore, considered to be a part of this invention, the scope of which is to be determined by the following claims:

I claim:

1. A mechanism for securing an axle having at least one road engaging wheel in alignment with a vehicle by means of a suspension system which includes a longitudinal beam, means for connecting the ends of the beam to the vehicle and means for connecting the axle to the beam at a location intermediate the ends of the beam, the mechanism comprising, as said means for connecting the axle to the beam, a first means for rigidly connecting the axle thereto and for slidably engaging the beam, said first means including a saddle member having a first surface compatible in shape with the outer cross-sectional shape of the axle and on which said axle resides and a second surface compatible in shape with the outer cross-sectional shape of the beam and on which the beam is slidably engaged and second means rigidly connected to said first means and extending to a location proximal the beam from which location said second means may be ridigly connected to said beam.

2. A mechanism according to claim 1 wherein said axle extends laterally of the vehicle and has at least one road engaging wheel at each end, said wheel being outboard of said suspension system and wherein there is a said longitudinal beam located on each side of said vehicle.

3. A mechanism according to claim 2 wherein one end of said beam is pivotally connected to said vehicle and the other end of said beam is resiliently connected to said vehicle.

4. A mechanism according to claim 3 wherein said pivotal connection at one end of the beam includes a resilient bushing and wherein said resiliently connection at the other end of the beam includes an airbag.

5. A mechanism according to claim 4 wherein said suspension system further includes a means for raising and lowering the said wheels out of and into road engagement, respectively with the road surface.

6. A mechanism according to claims 1, 2, 3, 4 or 5 wherein said first and second surfaces are joined by a wall member which rigidly retains the first and second surfaces so that sliding movement of the beam in said second surface moves the beam in a substantially perpendicular direction with respect to the axle, and wherein said second means includes a plate rigidly connected to the wall member and extending beyond a peripheral edge of said walled member to a location proximal the beam, at which location said plate is capable of being rigidly secured to said beam.

7. A mechanism according to claims 1, 2, 3, 4 or 5 wherein said first means for rigidly connecting the axle thereto includes a saddle member having a first surface compatible in shape with the outer cross-sectional shape of the axle and on which said axle resides, a second surface compatible in shape with the outer cross-sectional shape of the beam and within which the beam is slidably engaged, said first and second surfaces being joined by a walled member which rigidly retains the first and second surfaces so that sliding movement of the beam in said second surface moves the beam in a substantially perpendicular direction with respect to the axle, and wherein said second means includes a plate rigidly connected to the wall member and extending beyond a peripheral edge of said wall member to a location proximal the beam, at which location said plate is capable of being rigidly secured to said beam, said first means for rigidly connecting the axle thereto further including bolt means for retaining said axle on said first surface, said bolt means extending between said axle and said plate connected to the wall member, said bolt means including nut means which when tightened bring said axle into retaining engagement on said first surface.

8. A mechanism according to claims 1, 2, 3, 4 or 5 wherein said first and second surfaces are joined by a walled member which rigidly retains the first and second surfaces so that sliding movement of the beam in said second surfaces move the beam in a substantially perpendicular direction with respect to the axle, and wherein said second means includes a plate rigidly connected to the wall member and extending in one direction outboard of said wall member and in the other direction longitudinally along the beam and beyond a peripheral edge of said wall member to a location proximal the beam, at which location said plate is capable of being welded to said beam, said first means for rigidly connecting the axle thereto further including bolt means for retaining said axle on said first surface, said bolt means extending between said axle and said plate connected to the wall member, said bolt means including nut means which when tightened bring said axle into retained engagement on said first surface, wherein said first means for rigidly connecting the axle thereto further includes a weld, and wherein said bolt means extend through said plate, and said plate and said nut means are located with respect to said plate such that said plate serves to act against the nut means as they are tightened thereby to retain said alxe on said first surface.

9. A mechanism according to claims 1, 2, 3, 4 or 5 wherein said first and second surfaces are joined by a walled member which rigidly retains the first and second surfaces so that sliding movement of the beam in said second surface moves the beam in a substantially perpendicular direction with respect to the axle, and wherein said second means includes a plate rigidly connected to the wall member and extending beyond a peripheral edge of said wall member to a location proximal the beam, at which location said plate is capable of being rigidly secured to said beam, said first means for rigidly connecting the axle thereto further including bolt means for retaining said axle on said first surface, said bolt means extending between said axle and said plate connected to the wall member, said bolt means including nut means which when tightened bring said axle into retaining engagement on said first surface, wherein said first means for rididly connecting the axle thereto further includes a weld, and wherein said bolt means extend through said plate, and said plate and said nut means are located with respect to said plate such that said plate serves to act against the nut means as they are tightened thereby to retain said axle on said first surface, and wherein said second means further includes a spacer member located between said beam and that portion of the plate which extends beyond said peripheral edge of said wall member to a location proximal the beam.

10. In a wheeled vehicle having a longitudinal frame member on either side thereof to which a suspension system is connected, said suspension system including a longitudinal beam on each side thereof located adjacent and below a respective longitudinal frame member, a hanger bracket for pivotally connecting one end of the beam to its respective longitudinal frame member, an airbag means for resiliently connecting the other end of the beam to its respective longitudinal frame member, and means for connecting an axle to the suspension system; and axle having road engaging wheels at either end thereof connected by said means to said suspension; and a mechanism for securing the axle in alignment with the vehicle, the improvement comprising, as said mechanism, the mechanism of claim 1.

11. A wheeled vehicle according to claim 10 wherein said first and second surfaces are joined by a wall member which rigidly retains the first and second surfaces so that sliding movement of the beam in said second surface moves the beam in a substantially perpendicular direction with respect to the axle, and wherein said second means includes a plate rigidly connected to the wall member and extending in one direction outwardly from said wall and in another direction substantially parallel to the longitudinal axis of the beam and beyond a peripheral edge of said walled member to a location proximal the beam, at which location said plate is rigidly secured to said beam.

12. A wheeled vehicle according to claim 11 wherein said first means is rigidly connected to the axle at said first surface and further includes bolt means for retaining said axle on said first surface, said bolt means extending between said axle and said plate connected to the wall member, said bolt means including nut means which when tightened bring said axle into retaining engagement on said first surface.

13. A wheeled vehicle according to claim 12 wherein said first means for rigidly connecting the axle thereto further includes a weld, and wherein said bolt means extend through said plate, and said plate and said nut means are located with respect to said plate such that said plate serves to act against the nut means as they are tightened thereby to retain said axle on said first surface, and wherein said plate is rigidly secured to said beam at said location by a weld.

14. A wheeled vehicle according to claim 12 wherein said second means further includes a spacer member located between said beam and that portion of the plate which extends beyond said peripheral edge of said wall member to a location proximal the beam, and said plate is welded to said spacer member.

15. A method of securing an axle having road engaging wheels attached thereto in alignment with a vehicle by means of a suspension system which includes a longitudinal beam, means for connecting the ends of the beam to the vehicle and means for connecting the axle to the beam at a location intermediate the ends of the beam, the steps comprising
  (a) providing an axle having road engaging wheels attached thereto,
  (b) providing a suspension system which includes a longitudinal beam, means for connecting the ends of the beam to the vehicle and means for connecting the axle to the beam at a location intermediate the ends of the beam,
  (c) providing a mechanism for securing the axle in alignment with the vehicle, the mechanism comprising, as said means for connecting the axle to the beam, a first means for rigidly connecting the axle thereto and for slidably engaging the beam, said first means including a saddle member having a first surface compatible in shape with the outer cross-sectional shape of the axle and on which said axle resides and a second surface compatible in shape with the outer cross-sectional shape of the beam and on which the beam is slidably engaged and a second means rigidly connected to said first means and extending to a location proximal the beam from which location said second means may be rigidly connected to said beam,
  (d) rigidly connecting the axle to the said first means,
  (e) slidably engaging the beam in said first means,
  (f) locating said second means proximal to the beam,
  (g) connecting the suspension system to the vehicle,
  (h) aligning the axle with respect to the vehicle by sliding the beam in said first means until the desired alignment position is obtained, and
  (i) thereafter rigidly connecting said second means to said beam, at said location proximal the beam.

16. A method according to claim 15 wherein said first and second surfaces are joined by a walled member which rigidly retains the first and second surfaces so that sliding movement of the beam in said second surface moves the beam in a substantially perpendicular direction with respect to the axle, and wherein said second means includes a plate rigidly connected to the wall member and extending beyond a peripheral edge of said wall member to a location proximal the beam, at which location said plate is capable of being rigidly secured to said beam, said first means for rigidly connecting the axle thereto further including bolt means for retaining said axle on said first surface, said bolt means extending between said axle and said plate connected to the wall member, said bolt means including nut means which when tightened bring said axle into retaining engagement on said first surface, and wherein said step of rigidly connecting the axle to the first means includes tightening said nut means.

17. A method according to claim 16 wherein said step of rigidly connecting the axle to the first means further includes welding the axle to said saddle member, and wherein said step of rigidly connecting said second means to said beam includes forming a weld between said plate and said beam at said location proximal the beam.

18. A method according to claim 17 wherein said step of rigidly connecting said second means to said beam includes providing a spacer member between the beam and that portion of the plate which extends beyond the peripheral edge of said walled member to a location proximal the beam and to welding the spacer member to the beam and the said portion of the plate which extends beyond the peripheral edge of the walled member.

19. A mechanism according to claims 1, 2, 3, 4 or 5 wherein said mechanism further includes said beam and wherein said second means is welded to said beam and said location proximal the beam.

* * * * *